United States Patent [19]

Ettenberg

[11] Patent Number: 4,547,876
[45] Date of Patent: Oct. 15, 1985

[54] OPTICAL RECORDING MEDIUM AND INFORMATION RECORD AND METHOD OF MAKING SAME

[75] Inventor: Michael Ettenberg, Freehold, N.J.

[73] Assignee: RCA Corporation, Princeton, N.J.

[21] Appl. No.: 542,028

[22] Filed: Oct. 14, 1983

Related U.S. Application Data

[63] Continuation of Ser. No. 293,169, Aug. 17, 1981, abandoned.

[51] Int. Cl.⁴ ............................................. G11B 7/00
[52] U.S. Cl. ..................................... 369/275; 369/44; 369/279; 369/286; 346/135.1
[58] Field of Search ................... 369/93, 94, 44, 111, 369/275, 277, 279, 284, 286, 288; 346/76 L, 135.1

[56] References Cited

U.S. PATENT DOCUMENTS

| | | | |
|---|---|---|---|
| 3,665,483 | 5/1972 | Becker et al. | 346/1 |
| 4,069,487 | 1/1978 | Kasai et al. | 346/76 L |
| 4,097,895 | 6/1978 | Spong | 358/128 |
| 4,101,907 | 7/1978 | Bell et al. | 346/135 |
| 4,176,377 | 11/1979 | Howe | 358/128 |
| 4,216,501 | 8/1980 | Bell | 358/128.5 |
| 4,252,889 | 2/1981 | Ettenberg | 369/275 |
| 4,359,750 | 11/1982 | Howe | 369/275 |

OTHER PUBLICATIONS

IEEE Spectrum, Aug. 1978, pp. 26–28.
Bulthuies, K. et al., "Ten Billion Bits on a Disk", IEEE Spectrum, Aug. 1979, pp. 26–33.

*Primary Examiner*—Alan Faber
*Attorney, Agent, or Firm*—Birgit E. Morris; William J. Burke

[57] ABSTRACT

The invention comprises an improved optical recording medium and information record wherein the light sensitive layer comprises a tracking layer having one or more openings extending therethrough and an absorber layer overlying the tracking layer and the openings therein thereby forming first and second regions of the light sensitive layer having different reflectivities which can be used to provide radial tracking information.

The method of the invention includes the steps of depositing a tracking layer onto a light reflective layer, forming one or more openings through the tracking layer and depositing an absorber layer over the tracking layer and into the openings therein.

18 Claims, 4 Drawing Figures

OPTICAL RECORDING MEDIUM AND INFORMATION RECORD AND METHOD OF MAKING SAME

This is a continuation of application Ser. No. 293,169 filed 8/17/1981, now abandoned.

The invention relates to an optical recording medium and information record having a light sensitive layer with spatially varying optical properties useful for providing radial tracking information and a method of making the same.

BACKGROUND OF THE INVENTION

Spong, in U.S. Pat. No. 4,097,895, incorporated herein by reference, disclosed a bilayer optical recording medium which comprises a light reflective layer coated with a light absorbing layer. Bell, in U.S. Pat. No. 4,216,501, incorporated herein by reference, disclosed a trilayer optical recording medium having a transparent spacer layer interposed between the reflective and absorbing layers of Spong. Information is recorded in either medium by locally changing its optical properties; for example, by melting, ablating or otherwise changing the optical properties of the absorbing layer. The resulting change in the transmissivity or reflectivity of the recording medium in the exposed portions is detected for readout of the recorded information.

Such recording media are substantially uniform in their structural and optical properties prior to exposure and thus contain no means by which a track can be defined or followed prior to the recording of information. A recording medium having a pregrooved substrate contains such means but does not have the flexibility for changes of the track arrangement or identification after manufacturing. An alternative approach in which a portion of the light absorbing layer is removed by a laser beam thereby forming guard bands between light absorbing tracks has this flexibility, but the tracks may be damaged by the formation of the guard bands and the guard bands cannot be recorded on at a later date. It would be desirable to have a recording medium having guard bands in which the light absorbing tracks are undisturbed and in which information can be recorded at a later date.

SUMMARY OF THE INVENTION

The invention is an improved optical recording medium where the light sensitive layer comprises a tracking layer having one or more openings extending therethrough and an absorber layer overlying the tracking layer and the openings therein, thereby forming first and second regions having different thicknesses, such that the reflectivity in the first region is less than that in the second region. The information record of the invention comprises the optical recording medium of the invention with information recorded in the first region. The method of the invention comprises the steps of sequentially depositing a reflective layer and a tracking layer on a substrate, forming one or more openings in the tracking layer and depositing an absorber layer over the tracking layer and the openings therein.

DETAILED DESCRIPTION OF THE INVENTION

Figure 1:
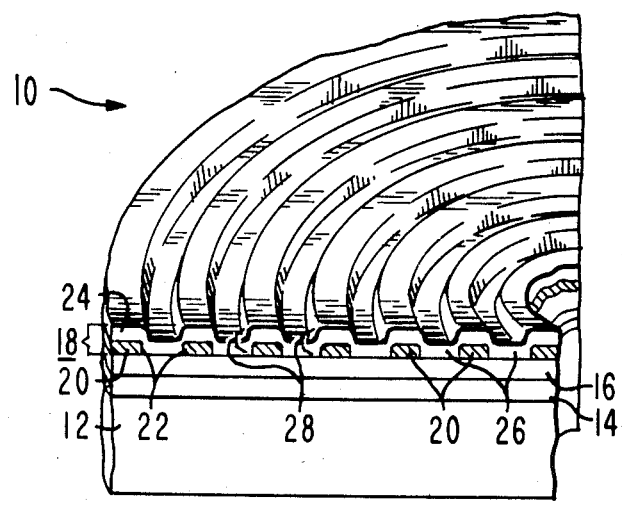
FIG. 1 is a plan view of a bilayer optical recording medium of the invention.

In FIG. 1 the optical recording medium 10 includes a substrate 12; a subbing layer 14 overlying a flat surface of the substrate 12; a planar light reflective layer 16 overlying the surface of the subbing layer 14; a light sensitive layer 18 overlying the surface of the light reflective layer 16 which is composed of a tracking layer 20 having one or more openings 22 extending therethrough, and a light absorber layer 24 which overlies the tracking layer 20 and the reflective layer 16 in the openings 22, thereby forming recording tracks 26 and guard bands 28.

Figure 2:
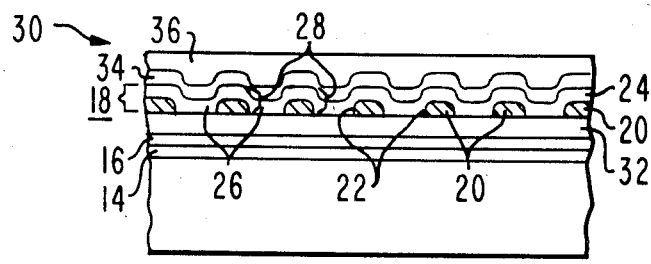
FIG. 2 is the cross-sectional view of a trilayer optical recording medium of the invention.
Figure 3:
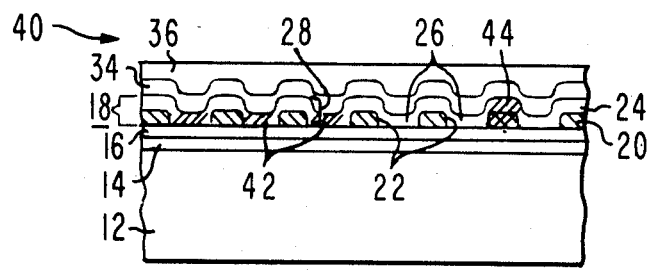
FIGS. 3 and 4 are cross-sectional views of two embodiments of the information record of the invention.
Figure 4:
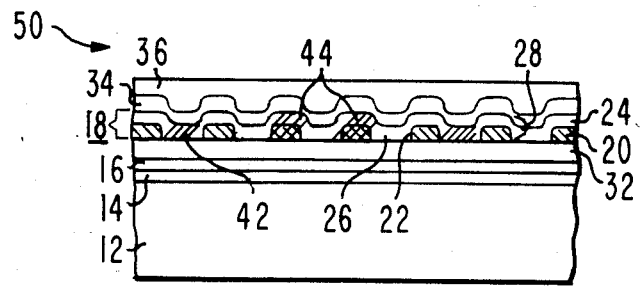

In FIGS. 2, 3, and 4 the identification of common elements of the optical recording medium 30 and the information records 40 and 50 respectively is the same as that for the optical recording medium 10 of FIG. 1.

In FIG. 2 the optical recording medium 30 also includes a spacer layer 32 interposed between the planar reflective layer 16 and the light sensitive layer 18. A barrier layer 34 overlies the absorber layer 24 and an overcoat layer 36 overlies the barrier layer 34.

In FIGS. 3 and 4 the information records 40 and 50 comprise the optical recording medium 10 of FIG. 1 and the recording medium 30 of FIG. 2 respectively having information recorded therein in the form of one or more areas 42 of the absorber layer 22 in the recording tracks 26 having different optical properties from the remainder of the absorber layer 24. The different optical properties of the areas 42 in the light sensitive layer 18 may result from an irreversible deformation of the absorber layer 24 such as a pit or a bubble in the layer, or may be a reversible change in the optical constants of the absorber layer 24, such as results from a change in the degree of crystallinity of the absorber layer as disclosed, for example, by Spong et al in pending U.S. patent application No. 400,979, filed July 22, 1982, which is a continuation of U.S. Pat. No. 254,649, filed Apr. 16, 1981, entitled INFORMATION RECORD AND A METHOD OF REVERSIBLY RECORDING AND ERASING INFORMATION THEREON which is incorporated herein by reference. The presence or absence of a change in the optical properties of the light sensitive layer 18 results in a change in the reflectivity of the recording medium, with the length and spacing between the areas 42 being indicative of the recorded information.

Information such as track identification numbers may also be recorded in the guard bands 28 either prior to or after the recording of information in the recording track 26. Such information can consist of one or more areas 44 of the guard band 28 which have different optical properties from the remainder of the guard band.

The substrate 12 may be made of glass, a plastic material, such as polyvinylchloride or (poly)methylmethacrylate, or a metal such as aluminum. The subbing layer 14 is a non-conformal coating of a plastic material, such as an epoxy or acrylic resin, having a microscopically smooth surface, which may be deposited on the surface of the substrate 12 prior to deposition of the reflective layer 16.

The reflective layer 16 reflects a substantial fraction, preferably at least 50%, of the incident light at the wavelength of a recording light beam and may be made of a metal such as aluminum or gold or a multi-layer dielectric reflector.

The spacer layer 32 of the recording medium 30 is substantially transparent and non-scattering at the recording and readout wavelengths. Suitable materials for this layer include organic materials such as fluorocarbon and hydrocarbon polymers and inorganic materials such as oxides of silicon, titanium, magnesium and aluminum. These materials may be deposited on the reflective layer 16 using deposition techniques well known in the art.

The tracking layer 20 absorbs light at the wavelength used to form the openings and may be an organic or inorganic material. Suitable inorganic materials include bismuth, titanium, rhodium, tellurium, selenium, and chalcogenide alloys containing tellurium or selenium. The tracking layer 20 may be between about 20 and about 150 nanometers thick and is preferably of a thickness at which the reflectivity of the combination of the reflective and tracking layers is reduced at the wavelength used to form the openings 22. The openings 22 may be in the form of a continuous or interrupted circular or spiral groove.

The absorber layer 24 which is a conformal coating over the reflective layer 16 and the tracking layer 20 having substantially uniform thickness and which is composed of a material which is sensitive to a recording light beam and can be of an organic or inorganic material. Suitable inorganic materials include bismuth, rhodium, titanium, tellurium, selenium, and chalcogenide alloys of tellurium and selenium. The thickness of the absorber layer 24 in the recording tracks 26 is such that the reflectivity of the optical recording medium 10 or 30 is reduced and preferably minimized, corresponding to the anti-reflection condition, in the recording tracks 26. For the optical recording medium 10, the optimum thickness may be determined from the optical constants of the reflective layer 16, the absorber layer 24 and any overlying layer for a particular wavelength using methods well known in the art, and is typically between about 20 and 100 nanometers. The sum of the thicknesses of the tracking layer 20 and absorber layer 24 in the guard bands 28 is such that the reflectivity at the particular wavelength is greater than in the recording tracks 26.

For the optical recording medium 30 the thickness of the absorber layer 24, may be determined from the thickness of the spacer layer 32 and the optical constants of the reflective layer 16, the spacer layer 32, the absorber layer 24, and any overlying layers and is typically between about 3 and 100 nanometers.

The barrier layer 34 is composed of a light transmissive material which provides a thermal and chemical barrier between the absorber layer 24 and the overcoat layer 36. It is preferably composed of an oxide of aluminum, magnesium, silicon, or titanium between about 50 and 500 nanometers thick. The overcoat layer 36 is composed of a light transmissive material such as silicone rubber, preferably between about 500 and 1500 micrometers thick. Such a combination of barrier and overcoat layers is disclosed by Bell et al in U.S. Pat. No. 4,101,907, issued July 18, 1978.

The invention described herein provides a recording medium whose light sensitive layer has thick and thin regions having different reflectivities due to their differing thicknesses. The embodiment described above is one in which the thickness of the absorber layer in the recording tracks is such that the reflectivity in that region is reduced as compared to that in the guard bands. The converse arrangement, in which the optical constants and thicknesses of the tracking and absorber layers together are such that the reflectivity in the guard bands is less than that in the recording tracks, with the roles of the recording tracks and guard bands reversed, may also be useful. The first embodiment is preferred, however, since the amount of material in the recording tracks which must be changed, by melting, ablation or otherwise, to record information, is minimized. Also, information is recorded in a layer of material which has not been perturbed after deposition, while damage to the tracking layer may result from the groove formation process.

In the operation of an optical recording, reading, or erasing system, the recording, reading or erasing light beam is centered on a track. Since the reflectivity of the two regions of the optical recording media and information records of the invention differ, the radial displacement of this beam or of a track-sensing beam can be detected as a change in the reflected intensity of the beam. This change can be converted into an electrical signal proportional to the displacement of the beam relative to the track which can, in turn, be used to correct the position of the recording, reading or erasing light beam.

The method of fabricating the optical medium of the invention includes the steps of: depositing a subbing layer onto the surface of a substrate; depositing a light reflective layer onto the surface of the subbing layer; depositing a tracking layer of absorptive material onto the light reflective layer; forming one or more openings through the tracking layer; depositing an absorber layer onto the tracking layer and into the openings therein; and depositing barrier and overcoat layers over the absorber layer. The openings may be formed by ablation or by melting and pullback of the melted material using a laser light beam whose wavelength may be the same or different from that used for the later recording of information. Alternatively, the openings may be formed using photolithographic and chemical etching techniques which are well known in the art.

I claim:

1. An optical recording medium comprising:
   a planar light-reflective layer;
   a tracking layer overlying said reflective layer and having one or more openings therein; and
   a conformal light-absorber layer having substantially uniform thickness overlying the tracking layer and the reflective layer in the openings in the tracking layer;
   wherein the thicknesses of the absorber and tracking layers are so chosen that there are first regions of the optical recording medium which have a reflectivity which is less than the reflectivity of second regions of the optical recording medium at a certain wavelength.

2. The optical recording medium of claim 1 wherein a substantially transparent spacer layer is interposed between said reflective and absorber layers and the thicknesses of said tracking, absorber and spacer layers are selected such that the reflectivity in said first regions is less than the reflectivity of the optical recording medium in said second regions at said wavelength.

3. The optical recording medium of claim 2 wherein the spacer layer is interposed between the reflective and tracking layers.

4. The optical recording medium of claim 1 wherein said first regions comprise those portions of the optical recording medium having openings in the tracking layer and wherein the thickness of the absorber layer in said first regions is so selected that the reflectivity of said first regions of the optical recording medium at said wavelength is minimized corresponding to the anti-reflection condition.

5. The optical recording medium of claim 4 wherein a substantially transparent spacer layer is interposed between said reflective and absorber layers and wherein the thicknesses of said spacer and absorber layers are selected such that the reflectivity of said first regions at said wavelength is minimized corresponding to the anti-reflection condition.

6. The optical recording medium of claim 5 wherein said spacer layer is interposed between said reflective and tracking layers.

7. An information record having information therein comprising:
   a planar light-reflective layer;
   a tracking layer overlying said reflective layer and having one or more openings therein; and
   a conformal light-absorber layer having substantially uniform thickness overlying the tracking layer and the reflective layer in the openings in the tracking layer;
   wherein the thicknesses of the absorber and tracking layers are so chosen that there are first regions of the optical recording medium which have a reflectivity which is less than the reflectivity of second regions at a certain wavelength;
   wherein the information comprises one or more portions of said first region which have different optical properties from the remainder of said first region.

8. The information record of claim 7 wherein a substantially transparent spacer layer is interposed between said reflective and absorber layers and the thicknesses of said tracking, absorber and spacer layers are selected such that the reflectivity in said first regions is less than the reflectivity of the optical recording medium in said second regions at said wavelength.

9. The information record of claim 8 wherein said spacer layer is interposed between said reflective and tracking layers.

10. The information record of claim 7 wherein said first regions comprise those portions of the optical recording medium having openings in the tracking layer and wherein the thickness of the absorber layer in said first regions is so selected that the reflectivity of said first regions of the optical recording medium at said wavelength is minimized corresponding to the anti-reflection condition.

11. The information record of claim 10 wherein a substantially transparent spacer layer is interposed between said reflective and absorber layers and wherein the thicknesses of said spacer and absorber layers are selected such that the reflectivity of the first regions at said wavelength is minimized corresponding to the anti-reflection condition.

12. The information record of claim 11 wherein said spacer layer is interposed between said reflective and tracking layers.

13. The information record of claim 7 wherein each of said portions includes a pit in the absorber layer.

14. The information record of claim 7 wherein each of said portions includes material having different optical constants from those of the material comprising the remainder of the first regions.

15. The information record of claim 7 wherein said second region has information therein which comprises one or more portions of said second region having different optical properties from the remainder of said second region.

16. A method of fabricating an optical recording medium comprising the steps of:
   depositing a light-reflective layer onto a surface of a substrate;
   forming a tracking layer having openings therethrough on said light-reflective layer; and
   forming a conformal light-absorber layer over said tracking layer and said reflective layer in the openings in said tracking layer.

17. The method of claim 16 further comprising the step of forming a substantially transparent spacer layer over said reflective layer prior to forming said light-absorber layer.

18. The method of claim 16 wherein the step of forming one or more openings in said tracking layer comprises melting and ablating the tracking layer by exposure to a light beam.

* * * * *